(12) United States Patent
Berjot et al.

(10) Patent No.: US 12,454,364 B2
(45) Date of Patent: Oct. 28, 2025

(54) CENTRAL FASTENING SYSTEM FOR AN AIRCRAFT, FASTENING A STRUCTURE OF A WING TO A STRUCTURE OF A PYLON

(71) Applicant: Airbus Operations SAS, Toulouse (FR)

(72) Inventors: Michael Berjot, Toulouse (FR);
Philippe Bonhomme, Toulouse (FR);
Paul-Adrien Taveau, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/618,244

(22) Filed: Mar. 27, 2024

(65) Prior Publication Data

US 2024/0327009 A1  Oct. 3, 2024

(30) Foreign Application Priority Data

Mar. 29, 2023 (FR) ..................................... 2303011

(51) Int. Cl.
*B64D 27/40* (2024.01)
*F16C 11/04* (2006.01)

(52) U.S. Cl.
CPC ............ *B64D 27/404* (2024.01); *F16C 11/04* (2013.01)

(58) Field of Classification Search
CPC .. B64D 274/18; B64D 274/12; B64D 274/40; B64D 274/402; B64D 274/404; B64D 274/406; B64D 29/06; B64C 3/32
See application file for complete search history.

(56) References Cited

U.S. PATENT DOCUMENTS

| | | | |
|---|---|---|---|
| 9,248,921 B2 | 2/2016 | West | |
| 10,189,575 B2 * | 1/2019 | Ewens | .................. B64D 27/18 |
| 10,583,930 B2 * | 3/2020 | West | ........................ B64C 3/32 |
| 2017/0096229 A1 | 4/2017 | Pautis et al. | |
| 2017/0106989 A1 * | 4/2017 | Takeuchi | ............... B64D 27/40 |
| 2017/0152052 A1 | 6/2017 | Ewens et al. | |
| 2018/0346137 A1 | 12/2018 | West | |

FOREIGN PATENT DOCUMENTS

| | | |
|---|---|---|
| FR | 3041935 A1 | 4/2017 |
| FR | 3044297 A1 | 6/2017 |

OTHER PUBLICATIONS

French Search Report for corresponding French Patent Application No. 2303011 dated Sep. 15, 2023.

* cited by examiner

*Primary Examiner* — Arfan Y. Sinaki
(74) *Attorney, Agent, or Firm* — Greer, Burns & Crain, Ltd.

(57) ABSTRACT

A central fastening system having a first central fitting as one with a structure of a wing, a second central fitting as one with a structure of a pylon, a first connection system and a second connection system, wherein each connection system is fastened to the first central fitting and to the second central fitting by clevis type connections and wherein the two connection systems cross between the first central fitting and the second central fitting.

5 Claims, 2 Drawing Sheets

CENTRAL FASTENING SYSTEM FOR AN AIRCRAFT, FASTENING A STRUCTURE OF A WING TO A STRUCTURE OF A PYLON

CROSS-REFERENCES TO RELATED APPLICATIONS

This application claims the benefit of French Patent Application Number 2303011 filed on Mar. 29, 2023, the entire disclosure of which is incorporated herein by way of reference.

FIELD OF THE INVENTION

The present invention relates to the general field of attaching a jet engine beneath the wing of an aircraft. It relates in particular to a central fastening system for an aircraft that fastens a structure of a wing to a structure of a pylon of the aircraft. The present invention also relates to an aircraft equipped with such a central fastening system.

BACKGROUND OF THE INVENTION

An aircraft of the prior art has a wing, a pylon fastened beneath the wing, and an engine, such as a jet engine, fastened beneath the pylon.

FIG. 4 shows an example of a fastening assembly 400 of the prior art that fastens a structure 402 of the wing to a structure 404 of the pylon. The pylon conventionally takes the form of a box that has, inter alia, two lateral walls 404a-b, namely a port-side lateral wall 404a and a starboard-side lateral wall 404b, and, between the lateral walls 404a-b, a first central fitting 404c that is generally perpendicular to said lateral walls 404a-b and that may take the form of a wall.

In the example in FIG. 4, the fastening assembly 400 has two lateral fastenings 406a-b, namely a port-side lateral fastening 406a and a starboard-side lateral fastening 406b, and a central fastening system 406c.

Each lateral fastening 406a-b has a second lateral fitting 408 that is fastened to the structure 402 of the wing and that has a female clevis 408a into which the lateral wall 404a-b that is on the same side is inserted. For each side, the female clevis 408a and the associated lateral wall 404a-b are secured by a pin 410 passing through said female clevis 408a and said lateral wall 404a-b through bores provided for this purpose.

The central fastening system 406c has a central fitting 412 fastened to the structure 402 of the wing and having two male clevises 412a-b, and four rods 414 distributed in pairs. For each pair of rods 414, the rods 414 of the pair are disposed on either side of a male clevis 412a-b so as to form a female clevis in which said male clevis 412a-b is housed.

The central fastening system 406c also has the first central fitting 404c forming two male clevises 405a-b and, for each pair of rods 414, the rods 414 of the pair are also disposed on either side of one of the male clevises 405a-b of the first central fitting 404c so as to form a female clevis in which said male clevis 405a-b is housed. There is one pair of rods 414 disposed on the port side and one on the starboard side.

For each pair of rods 414, a pin 416a, 416b is provided that passes through the two rods 414 of the pair and, as the case may be, a male clevis 412a-b of the central fitting 412 or a male clevis 405a-b of the first central fitting 404c through bores provided for this purpose.

Each pair of rods 414 thus has a first articulation point at the male clevis 412a-b of the central fitting 412 and a second articulation point at the male clevis 405a-b of the first central fitting 404c, and the first two articulation points are close to one another while the second articulation points are far apart from one another.

Although such an arrangement offers good performance, it is relatively bulky in the vertical direction.

SUMMARY OF THE INVENTION

An object of the present invention is to propose a central fastening system for an aircraft, wherein the fastening system fastens a structure of a wing and a structure of a pylon to one another, and wherein the fastening system has reduced vertical dimensions compared with the prior art.

To that end, a central fastening system intended for fastening a structure of a wing of an aircraft to a structure of a pylon of said aircraft is proposed, said central fastening system having a longitudinal direction and having:
- a first central fitting intended to be as one with the structure of the wing and having a first port-side clevis and a first starboard-side clevis, wherein each first clevis has a bore of which the axis is parallel to the longitudinal direction,
- a second central fitting intended to be as one with the structure of the pylon and having a second port-side clevis and a second starboard-side clevis, wherein each second clevis has a bore of which the axis is parallel to the longitudinal direction,
- a first connection system and a second connection system, each having a third clevis and a fourth clevis, wherein each third and fourth clevis has a bore of which the axis is parallel to the longitudinal direction, wherein the third clevis of the first connection system is mounted articulated with the first port-side clevis of the first central fitting at a first articulation point on the port side, wherein the third clevis of the second connection system is mounted articulated with the first starboard-side clevis of the first central fitting at a first articulation point on the starboard side, wherein the fourth clevis of the first connection system is mounted articulated with the second starboard-side clevis of the second central fitting at a second articulation point on the starboard side, and wherein the fourth clevis of the second connection system is mounted articulated with the second port-side clevis of the second central fitting at a second articulation point on the port side, and
- for each articulation point, a pin mounted in the bores of the corresponding clevises.

With such an arrangement, the vertical bulk is reduced compared with the prior art. In addition, such an arrangement promotes damage tolerance by isolating each articulation point.

Advantageously, at least one out of the first connection system and the second connection system takes the form of two rods disposed on either side of the first clevis associated with the first central fitting and on either side of the second clevis associated with the second central fitting, and, together, the two rods form the third clevis and the fourth clevis of the connection system under consideration.

Advantageously, at least one out of the first connection system and the second connection system takes the form of a rod of which a first end takes the form of a female clevis and of which the other end takes the form of a male clevis and said female clevis forms one out of the third clevis and the fourth clevis of the connection system under consideration, and said male clevis forms the other out of the fourth clevis and the third clevis of the connection system under consideration.

Advantageously, at least one out of the first connection system and the second connection system takes the form of a rod of which each end takes the form of a female clevis and one of the female clevises forms one out of the third clevis and the fourth clevis of the connection system under consideration, and the other of the female clevises forms the other out of the fourth clevis and the third clevis of the connection system under consideration.

Advantageously, at least one out of the first connection system and the second connection system takes the form of a rod of which each end takes the form of a male clevis and one of the male clevises forms one out of the third clevis and the fourth clevis of the connection system under consideration, and the other of the male clevises forms the other out of the fourth clevis and the third clevis of the connection system under consideration.

The invention also proposes an aircraft having a wing with a structure, a pylon with a structure and a fastening system according to one of the preceding variants, wherein the first central fitting is as one with the structure of the wing and wherein the second central fitting is as one with the structure of the pylon.

BRIEF DESCRIPTION OF THE DRAWINGS

The above-mentioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
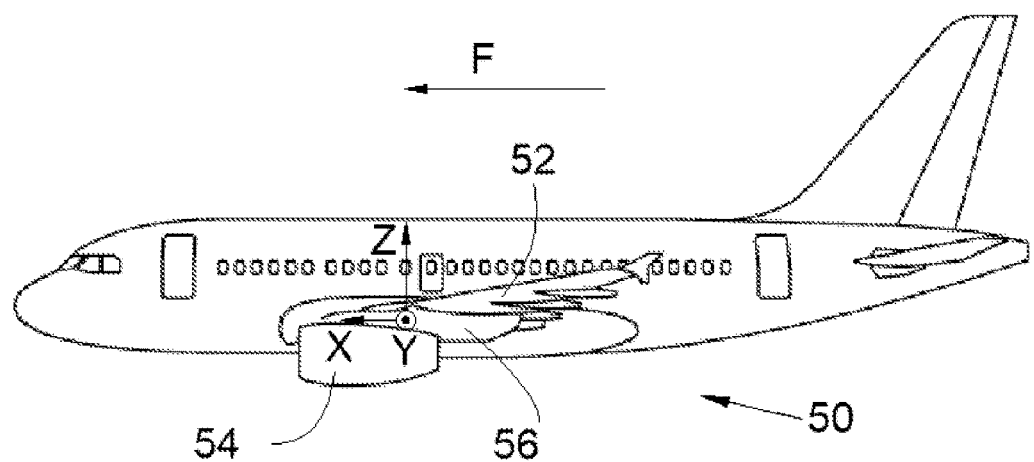
FIG. 1 shows a side view of an aircraft according to the invention.

FIG. 1 shows an aircraft 50 that has a wing 52 beneath which is mounted an engine 54 such as a jet engine. The engine 54 is mounted via a pylon 56 that has a structure fastened between a structure of the wing 52 and a structure of the engine 54.

By convention, the X direction is the longitudinal direction of the pylon 56, this direction X being parallel to a longitudinal axis of the aircraft 50. Moreover, the Y direction is the transverse direction of the pylon 56, which is horizontal when the aircraft 50 is on the ground, and the Z direction is the vertical direction or vertical height when the aircraft 50 is on the ground, these three directions X, Y and Z being mutually orthogonal.

Moreover, the terms "front" and "rear" are to be considered relative to a direction of forward movement of the aircraft 50 when the engine 54 is in operation, this direction being schematically shown by the arrow F. The terms "port" and "starboard" are also to be considered relative to the direction of forward movement F of the aircraft 50 and relative to the longitudinal direction X.

Figure 2:
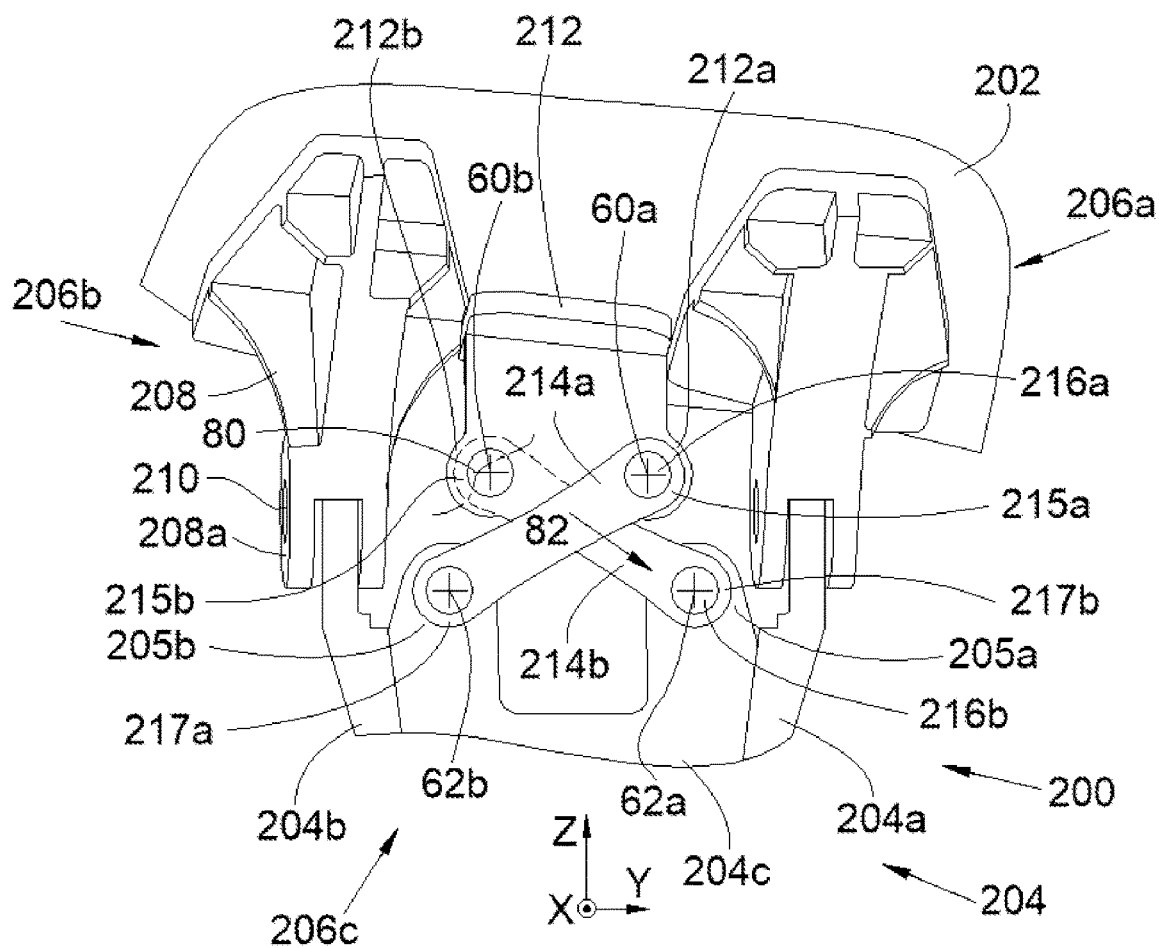
FIG. 2 is a perspective view of a fastening assembly having an example of a central fastening system according to the invention.

FIG. 2 shows an example of a fastening assembly 200 according to the invention, which fastens the structure 202 of the wing 52 to the structure 204 of the pylon 56. The pylon 56 takes, for example, the form of a box and it has, inter alia, two lateral walls 204a-b, namely a port-side lateral wall 204a and a starboard-side lateral wall 204b, and, between the lateral walls 204a-b, a central fitting 204c, known as second central fitting 204c, that is generally perpendicular to said lateral walls 204a-b and fastened between them. The second central fitting 204c is generally perpendicular to the longitudinal direction X and the lateral walls 204a-b are generally parallel to a median plane XZ of the pylon 56. The second central fitting 204c may take the form of a wall constituting an inner rib of the pylon 56. The second central fitting 204c is thus as one with the structure 204 of the pylon 56.

In the example in FIG. 2, the fastening assembly 200 has two lateral fastenings 206a-b, namely a port-side lateral fastening 206a and a starboard-side lateral fastening 206b, and a central fastening system 206c according to the invention that fastens the structure 202 of the wing 52 to the structure 204 of the pylon 56.

Each lateral fastening 206a-b is in this case identical to the lateral fastenings of the prior art. The lateral fastenings 206a-b are given here by way of example but do not form part of the invention, and serve merely to give an exemplary implementation of the invention.

Figure 3:
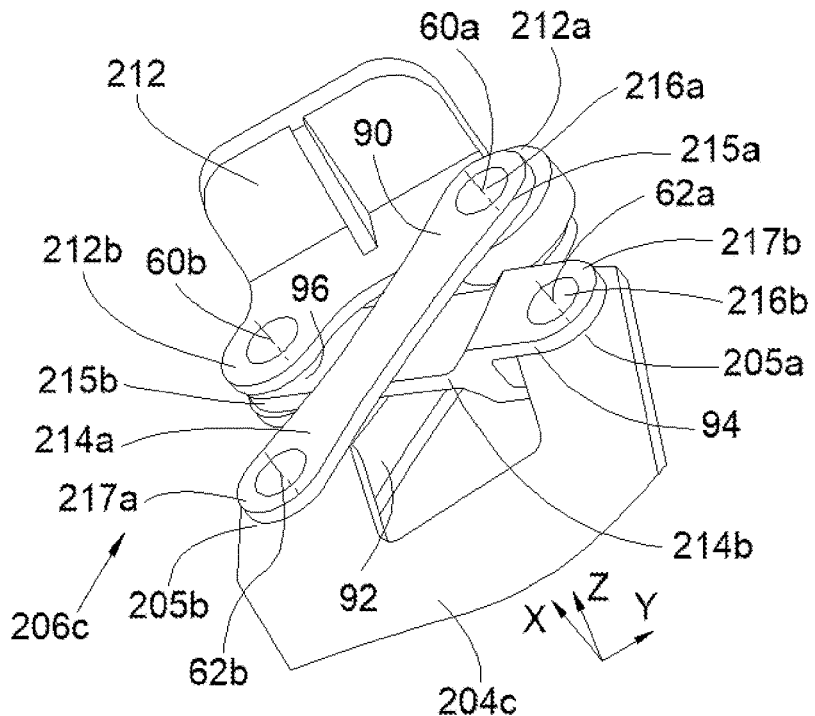
FIG. 3 is a perspective view of an example of a central fastening system according to the invention.
Figure 4:
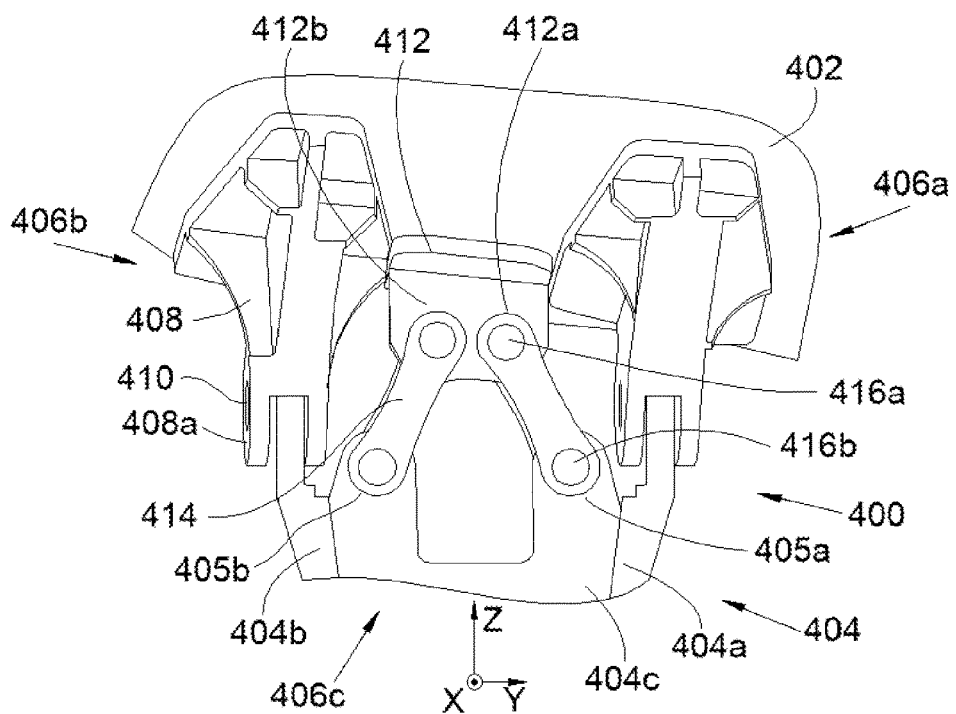
FIG. 4 is a perspective view of a fastening assembly of the prior art.

Each lateral fastening 206a-b has a lateral fitting 208 that is fastened to the structure 202 of the wing 52 and that has a female clevis 208a into which the lateral wall 204a-b of the pylon 56 that is on the same side is inserted. For each side, the female clevis 208a and the associated lateral wall 204a-b are secured by a pin 210 passing through said female clevis 208a and said lateral wall 204a-b through bores provided for this purpose. FIG. 3 shows the central fastening system 206c according to a particular embodiment of the invention.

The X direction is also a longitudinal direction X for the central fastening system 206c that has a first central fitting 212 as one with the structure 202 of the wing 52 and having two first clevises 212a-b, namely one 212a on the port side and one 212b on the starboard side.

The central fastening system 206c also has the second central fitting 204c having two second clevises 205a-b, namely one 205a on the port side and one 205b on the starboard side.

The central fastening system 206c also has two connection systems 214a-b, namely a first connection system 214a and a second connection system 214b. Each connection system 214a-b has a third clevis 215a-b and a fourth clevis 217a-b. The connection systems 214a-b transfer the transverse forces applied to the pylon 56.

Each first clevis 212a-b is fastened in an articulated manner to a third clevis 215a-b so as to form a first articulation point, namely a first articulation point 60a on the port side for the first port-side clevis 212a, and a first articulation point 60b on the starboard side for the first starboard-side clevis 212b.

Each second clevis 205a-b is fastened in an articulated manner to a fourth clevis 217b-a so as to form a second articulation point, namely a second articulation point 62a on the port side for the second port-side clevis 205a, and a second articulation point 62b on the starboard side for the second starboard-side clevis 205b.

The first connection system 214a is thus fastened in an articulated manner between the first articulation point 60a on the port side and the second articulation point 62b on the starboard side, and the second connection system 214b is thus fastened in an articulated manner between the first articulation point 60b on the starboard side and the second articulation point 62a on the port side.

In other words, the third clevis 215a of the first connection system 214a is mounted articulated with the first port-side clevis 212a of the first central fitting 212 at the first articulation point 60a on the port side, the third clevis 215b of the second connection system 214b is mounted articulated with the first starboard-side clevis 212b of the first central fitting 212 at the first articulation point 60b on the starboard side, the fourth clevis 217a of the first connection system 214a is mounted articulated with the second starboard-side clevis 205b of the second central fitting 204c at the second articulation point 62b on the starboard side, and the fourth clevis 217b of the second connection system 214b is mounted articulated with the second port-side clevis 205a of the second central fitting 204c at the second articulation point 62a on the port side.

The two connection systems 214a-b are therefore crossed and, depending on the angle at the crossing, the vertical bulk may be reduced compared with the prior art. In particular, the angle at the crossing is reduced by laterally separating the first articulation points 60a-b from one another and the second articulation points 62a-b from one another.

At each articulation point of the central fastening system 206c, two clevises are fastened to one another by a pin 216a-b passing through each clevis under consideration through orifices provided for this purpose and each articulation point corresponds to an axis that is parallel to the longitudinal direction X. Each clevis 212a-b, 205a-b, 215a-b, 217a-b of the central fastening system 206c thus has a bore of which the axis is parallel to the longitudinal direction X.

In the embodiment of the invention that is presented in FIG. 3, the first connection system 214a takes the form of two rods 90 and 92 disposed on either side of the first port-side clevis 212a of the first central fitting 212 and on either side of the second starboard-side clevis 205b of the second central fitting 204c. Together, the two rods 90 and 92 form the third clevis 215a and the fourth clevis 217a of the first connection system 214a and these are clevises known as female clevises. The first port-side clevis 212a of the first central fitting 212 and the second starboard-side clevis 205b of the second central fitting 204c each form a clevis known as a male clevis that is inserted into the corresponding female clevis.

A female clevis takes the form of a stirrup with two parallel walls, wherein each wall has a bore passing through it for putting the pin in place. A male clevis takes the form of a wall that has a bore passing through it for putting the pin in place.

In the embodiment of the invention that is presented in FIG. 3, the second connection system 214b takes the form of a rod of which a first end takes the form of a female clevis 94 with two parallel walls and of which the other end takes the form of a male clevis 96. In this case, said female clevis 94 forms the fourth clevis 217b of the second connection system 214b and the male clevis 96 forms the third clevis 215b of the second connection system 214b. The second port-side clevis 205a of the second central fitting 204c then forms a male clevis that is inserted into the female clevis 94 of the second connection system 214b. The first starboard-side clevis 212b of the first central fitting 212 then forms a female clevis into which the male clevis 96 of the second connection system 214b is inserted.

In the embodiment of the invention that is presented in FIG. 3, the rod forming the second connection system 214b is inserted between the two rods 90 and 92 forming the first connection system 214a.

In the event of breakage at one of the connection systems 214a-b, it is necessary to ensure the continuity of the transfer of the forces towards the wing 52.

With such an arrangement, if one of the rods 90, 92 of the first connection system 214a is broken, it is compensated for by the other rod 92, 90. If both rods 90, 92 of the first connection system 214a are broken, they are compensated for by the rod of the second connection system 214b. If the rod of the second connection system 214b is broken, it is compensated for by the rods 90, 92 of the first connection system 214a.

Other embodiments (not shown) are conceivable on the basis of the embodiment shown in FIG. 3.

For example, the second connection system 214b may also take the form of two rods disposed on either side of the first starboard-side clevis 212b of the first central fitting 212 and on either side of the second clevis 205a of the second central fitting 204c, so as to form together the third clevis 215b and the fourth clevis 217b of the second connection system 214b.

Thus, in general, at least one out of the first connection system 214a and the second connection system 214b takes the form of two rods 90 and 92 disposed on either side of the first clevis 212a-b associated with the first central fitting 212 and on either side of the second clevis 205b-a associated with the second central fitting 204c, and, together, the two rods 90 and 92 form the third clevis 215a-b and the fourth clevis 217a-b of the connection system 214a-b under consideration.

Each first clevis 212a-b of the first central fitting 212 and each second clevis 205a of the second central fitting 204c that are concerned each take the form of a male clevis that is inserted into the female clevis under consideration.

In the case in which the two connection systems 214a-b are constituted of two rods 90 and 92, the rods are offset along the longitudinal direction X, with a rod of a first connection system 214a-b, then a rod of a second connection system 214b-a, then a rod of the first connection system 214a-b, then a rod of the second connection system 214b-a.

For example, the first connection system 214a may also take the form of a rod of which a first end takes the form of a female clevis and of which the second end takes the form of a male clevis.

For the first connection system 214a just as for the second connection system 214b, the positions of the male clevis and of the female clevis may be reversed with respect to the first central fitting 212 and the second central fitting 204c.

Thus, in general, at least one out of the first connection system 214a and the second connection system 214b takes the form of a rod of which a first end takes the form of a female clevis 94 and of which the other end takes the form of a male clevis 96 and said female clevis 94 forms one out of the third clevis 215a-b and the fourth clevis 217a-b of the connection system 214a-b under consideration, and said male clevis 96 forms the other out of the fourth clevis 217a-b and the third clevis 215a-b of the connection system 214a-b under consideration.

Each first clevis 212a-b of the first central fitting 212 and each second clevis 205a of the second central fitting 204c that are concerned each take the appropriate form, i.e., a male clevis when it cooperates with a female clevis and vice versa.

For example, a rod may have a female clevis at each end. Thus, for the second connection system 214b, each end takes the form of a female clevis and one forms the fourth clevis 217b of the second connection system 214b and the other forms the third clevis 215b of the second connection system 214b. The second port-side clevis 205a of the second central fitting 204c then forms a male clevis that is inserted into one of the female clevises of the second connection system 214b and the first starboard-side clevis 212b of the first central fitting 212 then forms a male clevis that is inserted into the other of the female clevises of the second connection system 214b.

Thus, in general, at least one out of the first connection system 214a and the second connection system 214b takes the form of a rod of which each end takes the form of a female clevis and one of the female clevises forms one out of the third clevis 215a-b and the fourth clevis 217a-b of the connection system 214a-b under consideration, and the other of the female clevises forms the other out of the fourth clevis 217a-b and the third clevis 215a-b of the connection system 214a-b under consideration.

Each first clevis 212a-b of the first central fitting 212 and each second clevis 205a of the second central fitting 204c that are concerned each take the form of a male clevis so as to cooperate with a female clevis.

For example, a rod may have a male clevis at each end. Thus, for the second connection system 214b, each end takes the form of a male clevis and one forms the fourth clevis 217b of the second connection system 214b and the other forms the third clevis 215b of the second connection system 214b. The second port-side clevis 205a of the second central fitting 204c then forms a female clevis into which one of the male clevises of the second connection system 214b is inserted and the first starboard-side clevis 212b of the first central fitting 212 then forms a female clevis into which the other of the male clevises of the second connection system 214b is inserted.

Thus, in general, at least one out of the first connection system 214a and the second connection system 214b takes the form of a rod of which each end takes the form of a male clevis and one of the male clevises forms one out of the third clevis 215a-b and the fourth clevis 217a-b of the connection system 214a-b under consideration, and the other of the male clevises forms the other out of the fourth clevis 217a-b and the third clevis 215a-b of the connection system 214a-b under consideration.

Each first clevis 212a-b of the first central fitting 212 and each second clevis 205a of the second central fitting 204c that are concerned each take the form of a female clevis so as to cooperate with a male clevis.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A central fastening system for fastening a structure of a wing of an aircraft to a structure of a pylon of said aircraft, said central fastening system having a longitudinal direction, said central fastening system comprising:

a first central fitting configured to be as one with the structure of the wing and having a first port-side clevis and a first starboard-side clevis, wherein each first clevis has a bore with an axis parallel to the longitudinal direction, a second central fitting configured to be as one with the structure of the pylon and having a second port-side clevis and a second starboard-side clevis, wherein each second clevis has a bore with an axis parallel to the longitudinal direction, a first connection system and a second connection system, each connection system having a third clevis and a fourth clevis, wherein each third and fourth clevis has a bore with an axis parallel to the longitudinal direction, wherein the third clevis of the first connection system is mounted articulated with the first port-side clevis of the first central fitting at a first articulation point on a port side, wherein the third clevis of the second connection system is mounted articulated with the first starboard-side clevis of the first central fitting at a first articulation point on a starboard side, wherein the fourth clevis of the first connection system is mounted articulated with the second starboard-side clevis of the second central fitting at a second articulation point on the starboard side, and wherein the fourth clevis of the second connection system is mounted articulated with the second port-side clevis of the second central fitting at a second articulation point on the port side, and for each articulation point, a pin mounted in the bores of the corresponding clevises.

2. The central fastening system according to claim 1, wherein the first connection system comprises two rods disposed on either side of the first port-side clevis and the first starboard-side clevis and on either side of the second port-side clevis and the second starboard-side clevis, and wherein together the two rods form the third clevis and the fourth clevis of said first connection system.

3. The central fastening system according to claim 1, wherein one or both of the first connection system and the second connection system comprises a rod having a first end with a female clevis and a second end comprising a male clevis, and wherein said female clevis forms one of the third clevis and the fourth clevis of the second connection system, and wherein said male clevis forms the other of the third clevis and the fourth clevis of said second connection system.

4. The central fastening system according to claim 1, wherein the first connection system comprises a rod wherein each end of the rod comprises a male clevis, and wherein one of the male clevises of the rod forms one of the third clevis and the fourth clevis of said first connection system, and wherein the other of the male clevises of the rod forms the other of the third clevis and the fourth clevis of said first connection system.

5. An aircraft comprising:
a wing with a structure,
a pylon with a structure, and
the central fastening system according to claim 1,
wherein the first central fitting is as one with the structure of the wing, and
wherein the second central fitting is as one with the structure of the pylon.

\* \* \* \* \*